United States Patent
Chheda et al.

[19]

[11] Patent Number: 6,160,999
[45] Date of Patent: Dec. 12, 2000

[54] WIRELESS COMMUNICATION SYSTEM PROVIDING IMPROVED FORWARD LINK MANAGEMENT AND METHOD OF OPERATION

[75] Inventors: Ashvin H. Chheda, Dallas; Ahmad Jalali, Plano, both of Tex.

[73] Assignee: Nortel Networks Limited, Montreal, Canada

[21] Appl. No.: 08/937,305

[22] Filed: Aug. 18, 1997

[51] Int. Cl.$^7$ .................................................. H04B 1/00
[52] U.S. Cl. ........................... 455/69; 455/436; 455/438; 455/67.4; 370/320
[58] Field of Search ................................... 455/436, 437, 455/438, 442, 69, 67.4; 370/320, 335, 342

[56] References Cited

U.S. PATENT DOCUMENTS

| | | |
|---|---|---|
| 5,574,983 | 11/1996 | Douzono et al. . |
| 5,594,718 | 1/1997 | Weaver, Jr. et al. ..................... 455/437 |
| 5,640,414 | 6/1997 | Blakeney, II et al. .................. 375/200 |
| 5,722,044 | 2/1998 | Padovani et al. . |
| 5,754,958 | 5/1998 | Tsuji et al. .............................. 455/436 |
| 5,768,684 | 6/1998 | Grubb et al. . |
| 5,809,430 | 9/1998 | D'Amico . |
| 5,878,350 | 3/1999 | Nakamura et al. ..................... 455/442 |

*Primary Examiner*—Daniel S. Hunter
*Assistant Examiner*—Darnell R. Armstrong
*Attorney, Agent, or Firm*—Bruce Garlick; James Harrison

[57] ABSTRACT

A wireless communication system facilitates wireless communication with a mobile unit operating within a respective service area. The wireless communication system includes a mobile switching center and a plurality of base stations with each base stations coupled to the mobile switching center and providing wireless coverage within a respective portion of the service area. The mobile unit wirelessly connects to at least two of the base stations (or sectors of the base stations) that transmit to the mobile unit via respective forward links at respective transmit levels. These respective transmit levels are based upon forward link requirements of the mobile unit. The mobile unit transmits to the at least two base stations/sectors via a respective plurality of reverse links. Forward link transmit levels may be determined based upon the quality of corresponding reverse link transmissions or from the quality of pilot signals or forward link transmissions received by the mobile unit. Forward link transmissions are made via the most favorable forward links (at least one) while transmissions are not made, or are made at reduced power levels on the least favorable forward links. During management of the wireless communication system, forward link transmissions are initiated and discontinued based upon the forward link transmission power requirements of the mobile unit. While managing the forward link transmissions, the forward link transmission power requirements of the mobile unit may be compared to a plurality of thresholds. When these thresholds are exceeded, the management requires altering which base stations make forward link transmissions and at what levels such transmissions are made. In a particular embodiment of the wireless communication system, the system operates according to a code division multiple access protocol.

43 Claims, 7 Drawing Sheets

WIRELESS COMMUNICATION SYSTEM PROVIDING IMPROVED FORWARD LINK MANAGEMENT AND METHOD OF OPERATION

BACKGROUND

1. Technical Field

The present invention relates generally to wireless communication systems; and more particularly to a wireless communication system in which multiple forward links to a single mobile unit are managed to maximize network capacity while ensuring robust performance during handoffs to maintain the grade of service as determined by error rates, voice quality and probability of dropped calls among other criterion.

2. Related Art

Wireless communication systems are well known in the art. In a typical cellular based wireless communication system, a mobile switching center (MSC) couples to a plurality of base stations to provide wireless coverage within a service area. Within the service area, each of the base stations provide wireless coverage within a respective cell. The cells may be further divided into sectors about the base station wherein separate coverage is provided within each sector of the cell. In combination therefore, the sectors of the cells and the cells provide wireless coverage throughout the service area. In combination, the MSC and base stations are often referred to as the "network."

Mobile and stationary wireless units operating within the service area establish links with one or more of the base stations via respective sectors and/or cells. The links with the base station(s) facilitate communication between the units and other units operating within the service area as well as between the units and units connected to the wireless communication system via the MSC. In most systems, the public switched telephone network (PSTN) couples to the MSC. Thus, the network allows units operating within the service area to communicate with units connected to the PSTN.

As mobile units move about within the service area, they move from sector to sector and/or from cell to cell. To maintain continuous/uninterrupted communication with the network, the mobile unit must dynamically connect and disconnect wireless links during operation within various sectors and/or cells. When the mobile unit dynamically alters links between the various cells/sectors during an ongoing communication, a handoff occurs. During a typical handoff, simultaneous communications are established between multiple base stations/sectors and the mobile unit. The multiple links are maintained during the handoff when needed and disconnected when they are no longer needed or no longer satisfy specified criteria.

For example, in a code division multiple access (CDMA) system, each mobile unit operating within the service area typically requests and establishes links with multiple base stations. In such CDMA systems, the mobile unit continuously measure pilot signal strengths transmitted from sectors and cells of base stations. When the strength of a pilot signal of a sector not currently communicating with the mobile unit exceeds a threshold (T_ADD), the mobile unit sends a pilot signal measurement message (PSMM) to the network via already connected sector(s). Based on the PSMM, the network typically establishes an additional link between the mobile unit and the additional sector or cell if resources permit. Once such link is established, through a sequence of messages that may include an enhanced handoff direction message (EHDM) and a handoff completion message (HCM), the sector or cell transmits forward link communications to the mobile unit. Thus, at any given time, multiple sectors in a handoff are typically transmitting identical data to the mobile unit. The mobile unit receives the data from the multiple sectors and uses maximal ratio combining or other combining techniques to combine the multiple received signals.

However, capacity within a CDMA system is limited to a greatest number of mobile units that can be receiving forward link transmissions from any cell or sector. Thus, during excessive handoff wherein mobile units receive forward link transmissions from multiple base stations, the overall capacity of the system is reduced as is the overhead available for other users. Further, because forward link transmissions intended for a particular mobile unit appears as noise to other mobile units within the system, the additional transmissions from the multiple base stations increases the multiple access noise level in the system.

The capacity in a CDMA system in terms of the average number of users (N) may be defined by the following equation:

$$N = (1 - (f_{Pilot} + f_{Page} + f_{Synch})/(g^2 \cdot f \cdot (hrf) - v)$$

where:

$N$ = the number of users an average sector can support assuming the above conditions;

$f_{Pilot}$ = the fraction of total HPA power allocated for the pilot channel;

$f_{Page}$ = the fraction of total HPA power allocated for the paging channel;

$f_{Synch}$ = the fraction of total HPA power allocated for the synch channel;

$g^2$ = the normalized average forward traffic channel gain;

$f$ = ratio of pilot power to total HPA power;

hrf = handoff reduction factor, a calculated value which takes into account the required resources due to different types of handoff; and $v$ = the voice activity factor.

The combination of $(g^2 \cdot f)$ represents the average of the transmit power fraction used per transmitting sector for a mobile in the network. Further, the handoff reduction factor may be further defined by:

$$hrf = n_{(1,1)} + 2 \cdot n_{(1,2)} + 3 \cdot n_{(1,3)} +$$
$$((2 \cdot n_{(2,2)} + 3 \cdot n_{(2,3)} + 4 \cdot n_{(2,4)}) \cdot v_2)/V +$$
$$((3 \cdot n_{(3,3)} + 4 \cdot n_{(3,4)} + 5 \cdot n_{(3,5)}) \cdot v_3)/V +$$
$$((4 \cdot n_{(4,4)} + 5 \cdot n_{(4,5)} + 6 \cdot n_{(4,6)} + 5 \cdot n_{(5,5)} + 6 \cdot n_{(5,6)}) \cdot v_4)/V$$

where:

$I \cdot n_{(j,k)}$ is defined as follows:

$I$ = number of sources of power control bits the system is having to send to the one mobile unit;

$n_{(j,k)}$ = the percentage of time the one mobile experienced this type of handoff;

$j$ = the number of cells with which the mobile is communicating; and $k$ = the number of sectors with which the mobile is communicating.

$v_X$ = X cell voice activity factor (i.e. the adjusted voice activity to account for variations in power gain of the power control bit due handoff involving X cells; and $V = 0.45$; the average Markov voice activity factor.

In operation of a system according to the above equations, when excess handoffs occur, hrf is high which lowers the capacity (N) of the system. In prior systems, hrf was difficult to reduce without increasing the ($g^2$*f) because of possible diversity loss from delays associated in adding/dropping sectors from the active set, which impacted capacity. Such was the case due to requirements of the prior systems during handoff. Thus, the overall forward link capacity (N) of the prior systems was limited since $g^2$*f increased more than hrf decreased.

In order to optimize transmit power requirements, forward link power control is employed. The forward link transmit power (of all sectors involved in soft handoff with the mobile unit) is incrementally reduced by a predetermined amount whenever good forward link frame reception is reported by the mobile unit on the reverse link. However, whenever a bad frame is reported on the reverse link by the mobile unit, the forward link transmit power is incrementally increased. The incremental increase is generally much larger than the incremental decrease and the increase/decrease ratio required to meet required frame error rates. Thus, an incremental increase reduces resources available to other mobile units.

A power control algorithm is typically implemented by/at the base station controller (BSC) which resides in the MSC. The algorithm determines the forward link transmit power for a particular mobile on a frame by frame basis and increments and decrements the forward link transmit power as described above. The determined power levels are typically sent to the base stations involved in the handoff with the mobile unit. Each base station then transmits forward link data to the mobile unit at the reported power level. Therefore, if the mobile is in a three way handoff, for example with one sector of one base station and two sectors of another base station, each of the sectors in the handoff will typically transmit information on the forward link to the mobile at the same power level at any instant of time.

During each soft handoff, all cells/sectors involved in the handoff transmit at the full power controlled by the power control algorithm employed on respective forward links. However, the forward link transmissions may not be required by the mobile unit in the handoff and reduce the pool of available resources for other users. Further, the unneeded forward link transmissions increase the multiple access noise floor in the system. Resultantly, the network capacity is reduced.

Thus there exists a need in the art for a wireless communication system in which forward link transmit power is managed so as to maintain/improve the grade of service and increase system capacity.

SUMMARY OF THE INVENTION

A wireless communication system constructed according the present invention facilitates wireless communication with a mobile unit operating within a respective service area. The wireless communication system includes a mobile switching center (MSC) and a plurality of base stations. Each of the plurality of base stations couple to the mobile switching center and provides wireless coverage within a respective portion of the service area, such respective portions including cells and/or sectors. The mobile unit, operating in the service area, wirelessly connects to at least two of the cells/sectors. Via the connection, at least two sectors transmit to the mobile unit via respective forward links at respective transmit levels. These respective transmit levels are based upon forward link requirements to the mobile unit.

Further, in the wireless communication system, the mobile unit transmits to at least two sectors via a respective plurality of reverse links. Thus, in one embodiment, sectors which will transmit on the forward links and respective transmit levels are determined based upon the quality of corresponding reverse link transmissions if the two sectors are from different base stations. In an alternative embodiment, sectors which will transmit on the forward links and respective transmit levels are determined based upon the pilot strength measurement message (PSMM) received by the network from the mobile unit which indicate strengths of pilot signals as measured by the mobile unit. Further, in managing the forward link transmissions, at least some of the respective transmit levels vary from other of the respective transmit levels. Thus, for example, when the wireless communication system has established five forward links between five respective base stations/sectors and the mobile unit, forward link transmissions may be made from only two of the base stations at full required transmit levels (the full level determined by power control) while forward link transmissions are made from the other three base stations at lower transmission levels. In some cases, transmissions from the other three base stations may be temporarily ceased.

As opposed to prior techniques, the present invention provides significant advantages and benefits. For example, in prior systems, the three sub-optimal base stations may have been removed from the active set of the mobile unit. After their removal, should any of the removed base stations become a dominant sector, for example when the mobile unit moves around behind building blocking forward link transmissions from a connected base station, they would not contribute. To receive transmissions from the previously sub-optimal base stations, the mobile unit must transmit a PSMM, the network must respond with a HDM, the mobile unit must add the base station(s) to its active set and must transmit a HCM to the network. During this time period, the other transmitting base stations must transmit at higher power levels, decreasing system capacity. Transmissions from the base station blocked from the mobile unit by the building increase, producing no benefit to the mobile unit but interfering with other ongoing communications. Further, during this time period, the call may be dropped.

According to the present invention, the three sub-optimal base stations remain in the mobile unit's active set. Thus, when the mobile unit moves behind the building, transmissions from one or more of the three previously sub-optimal base stations are initiated to prevent degradation of the service level. Overall forward link transmit levels are therefore lesser while satisfying forward link receipt of the mobile unit. Hence, according to the present invention, the power control process is modified so that handoff is affected through modification of the hrf, while the handoff process with respect to adding/dropping members of the active set of the mobile unit is unaffected.

In another particular embodiment, transmissions are made on the most favorable forward links (full transmit level determined by power control) while transmissions are not made, or are made at reduced power levels on the least favorable forward links. During management of the wireless communication system, forward link transmissions are initiated and discontinued based upon the forward link transmission power requirements to the mobile unit. While managing the forward link transmissions, the forward link transmission power requirements to the mobile unit may be compared to a plurality of thresholds. When these thresholds are exceeded, the management requires altering which sectors make forward link transmissions and at what levels such transmissions are made.

In a particular embodiment of the wireless communication system, the system operates according to a code division multiple access protocol. Thus, by minimizing and/or reducing forward link interference power as seen by other mobile units, the network capacity increases for a given grade of service. In achieving these benefits, sufficient forward link signal is provided to the mobile units to maintain forward link quality to the mobile unit.

In another particular embodiment of the wireless communication system, each base station provides wireless coverage within a plurality of sectors. In such system, each base station is capable of establishing wireless communication with the mobile unit via any of the plurality of sectors. Further, forward link transmissions via sectors are managed to control forward link transmit power.

The present invention also includes a method of operating a wireless communication system that facilitates wireless communication with a mobile unit operating within a respective service area. The method includes steps consistent with the operation of the wireless communication system described above along with the benefits.

Moreover, other aspects of the present invention will become apparent with further reference to the drawings and specification which follow.

DETAILED DESCRIPTION OF THE DRAWINGS

Figure 1:
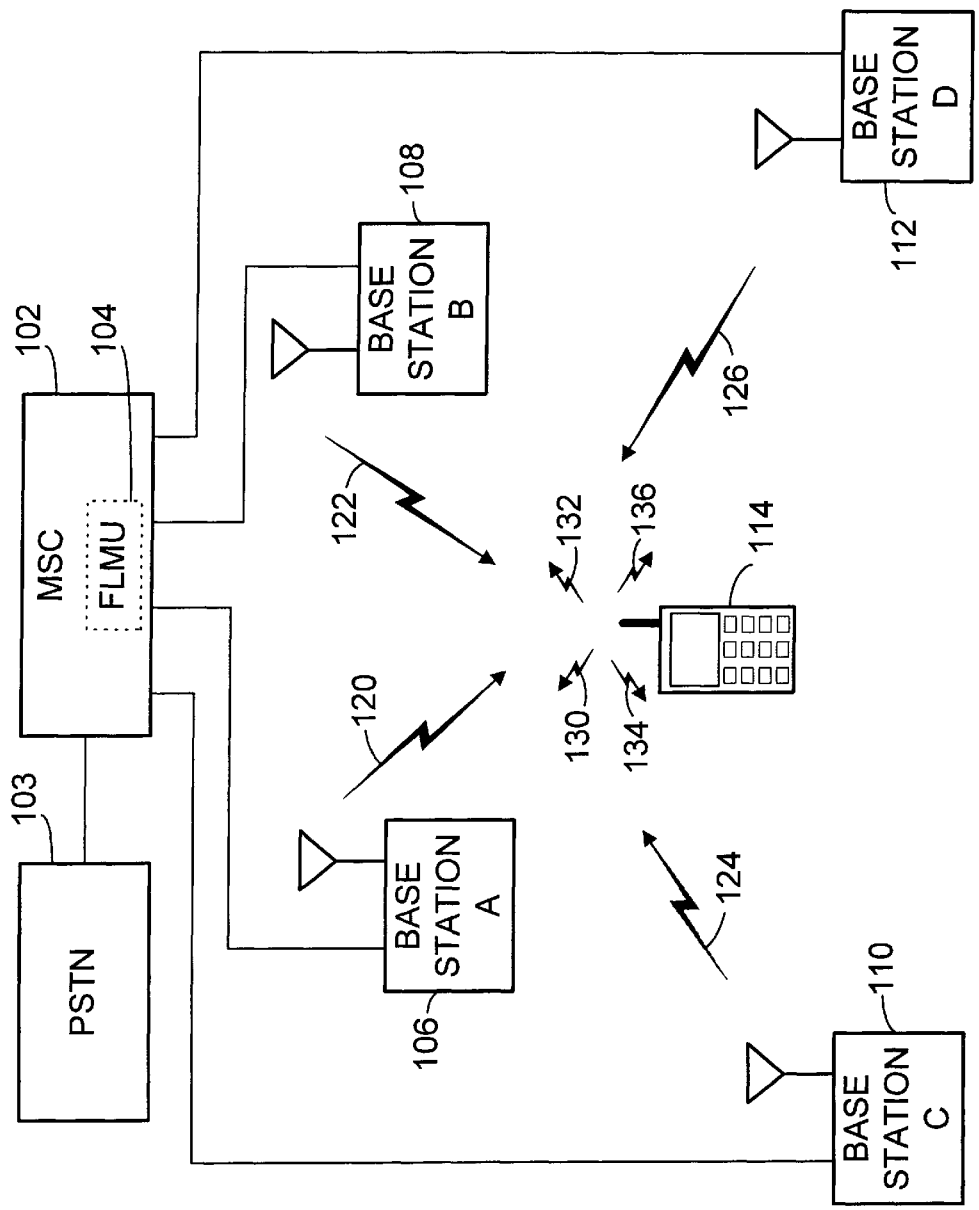
FIG. 1 is a block diagram illustrating a wireless communication system constructed according to the present invention in which forward link transmit power is actively managed to increase system capacity while maintaining system performance during soft handoffs.

FIG. 1 illustrates a wireless communication system 100 constructed according to the present invention in which forward link transmissions are managed to increase system capacity while maintaining grade of service (GOS). The wireless communication system 100 includes a mobile switching center (MSC) 102 and a plurality of base stations, base station A 106, base station B 108, base station C 110 and base station D 112. In combination, the MSC 102 and the base stations 106, 108, 110 and 112 are referred to as the "network" and provides wireless coverage within a respective service area.

In operation, the mobile unit 114 establishes links with one or more of the base stations 106, 108, 110 and 112 over which communications are enabled. Thus, with a link established, the mobile unit 114 may communicate with other units operating within the coverage area. Further, since the MSC 102 couples the network to the public switched telephone network (PSTN) 103, the mobile unit 114 may also communicate with telephones and other units coupled to the PSTN 103. Moreover, since the MSC 102 may also directly couple to other MSCs, the mobile unit 114 may also communicate with units operating in other connected wireless communication systems.

Each link between the mobile unit 114 and one of the base stations, 106 for example, includes a forward link over which transmissions from the base station to the mobile unit 114 occur and a reverse link over which transmissions from the mobile unit 114 to the respective base station occur. During normal operation, and particularly during soft handoffs, multiple links are established between multiple base stations and the mobile unit 114. According to the present invention, a forward link management unit (FLMU) 104, which may reside in MSC 102, manages forward link transmission requirements from the base stations 106, 108, 110 and 112 to the mobile unit 114. For example, when each base station 106, 108, 110 and 112 communicate with the mobile unit 114, the base stations communicate via forward links 120, 122, 124 and 126 and reverse links 130, 132, 134 and 136, respectively. In managing the forward links, the FLMU 104 may disable forward link transmissions from any of the various connected base stations to the mobile unit 114. Alternatively, the FLMU 104 may reduce the power of forward link transmissions from one or more of the base stations to the mobile unit 114. In disabling forward link transmissions, the hardware resources allocated to the mobile unit may not be allocated to other mobile units. However, when forward link transmission power is reduced or the transmissions are disabled, the power made available may be used for other mobile units' forward link transmissions.

The FLMU 304 may be implemented in various fashions. In one embodiment, the FLMU may include specifically designed hardware residing in the MSC 102 with corresponding hardware in base stations 106, 108, 110 and 112. However, in other embodiments, the functionality provided by the FLMU 104 may be implemented via hardware elements already in place in the MSC 102 and the base stations 106, 108, 110 and 112. In such an embodiment, software instructions may be used to execute the functionality of the FLMU 104. As will be appreciated, the principles of the present invention may be accomplished in various fashions based upon the particular implementation of the wireless communication system 100.

Forward link management is performed to minimize, or preclude, forward link transmissions which do not, or marginally negatively impact grade of service during soft handoff. According to the present invention, those forward links providing minimal diversity are set at reduced levels or set not to transmit until such forward links are required. In determining which forward links should be employed and which should not, the FLMU 104 continually monitors the quality and level of forward link transmissions and manages all forward links based upon the quality and level, and number of forward links. A determination of quality of the forward links may be made in various fashions. Using a particular technique, the FLMU 104 investigates the quality of reverse link transmissions and extrapolates the quality of the corresponding forward link transmissions. Using another technique, the FLMU 104 receives information from the mobile unit 114 that indicates the quality of forward link transmissions. Using still another technique, the FLMU 104 receives information from the mobile unit 114 regarding the quality of pilot signals received by the mobile unit 114 and estimates the quality of the forward links based upon the quality of the received pilot signals.

In an example of handoff operation (for handoff protocols, refer to the IS-95A standard), links have been established between each of the base stations 106, 108, 110 and 112 and the mobile unit 114. However, according to the present invention, only base station A 106 and base station C 110 transmit on their forward links to the wireless unit 114 on forward links 120 and 124, respectively according to the forward link power control setting. Simultaneously, even though base station B 108 and base station D 112 have established links with the mobile unit, they are not making forward link transmissions to the mobile unit 114. Thus, the noise, as seen by other mobile units operating in the service area, is minimized, the overhead pool of power for other mobile units is maximized and system capacity is increased while ensuring the grade of service. In an alternate embodiment, the base station B108 and base station D112 are transmitting on respective forward links at a lower power, such lower power perhaps being a minimum set value on forward link transmit power.

During a subsequent operation wherein the multiple links are still established, the mobile unit 114 continues to move within the wireless communication system 100. As it moves, the mobile unit 114 requires increased forward link transmit as reported by forward link power control power to maintain grade of service. As the forward link transmit power is increased from base station A 106 and base station C 110 on forward links 120 and 124, a threshold is reached. When this threshold is reached, base station B 108 (which is expected to provide a better forward link than base station D 112) is directed to commence transmitting on its forward link 122 at the full power control setting. When base station B 108 commences transmitting on its forward link 122, the diversity forward link transmissions received by the mobile unit 114 should maintain or improves the grade of service. However, should the mobile unit 114, via forward link power control operations, request additional increases in the forward link transmit power, the FLMU 104 directs base station D 112 to commence transmitting on forward link 126 to the mobile unit 114. Such additional forward link transmission should now maintain/improve the grade of service to meet desired levels.

With base stations A 106, B 108, C 110 and D 112 in the active set of the mobile unit 114, at such time that base station A 106 and base station B are each transmitting on respective forward links 120 and 122 at a power of $P_1$, transmissions from base stations C 110 and D 112 commence when the required power from each base station (A, B, C and D) will be $P_2$, such that $2*P_1 > 4*P_2$. The level of $P_2$ is determined to maintain the grade of service while minimizing impact on system capacity. If transmissions from base stations C 110 and D 112, were not initiated/increased, the increased power of transmissions from base stations A 106 and B 108 would continue increasing in an attempt to maintain the grade of service and, resultantly, would negatively impact system capacity.

During subsequent operation, as the forward link transmit power is decreased, the FLMU 104 may direct base station A 106 and base station C 110, for example, to decrease corresponding forward link transmission power. Alternatively, the FLMU 104 may instruct the base stations to cease transmitting on forward links 120 and 124, respectively. Thus, as the mobile unit 114 moves within the service area provided by the wireless communication system 100, diversity during soft handoffs is provided to maintain grade of service. Further, by reducing forward link transmissions from some of the connected base stations, system capacity is increased as multiple access noise is measured and pool of available power per sector is maximized.

Figure 2A:
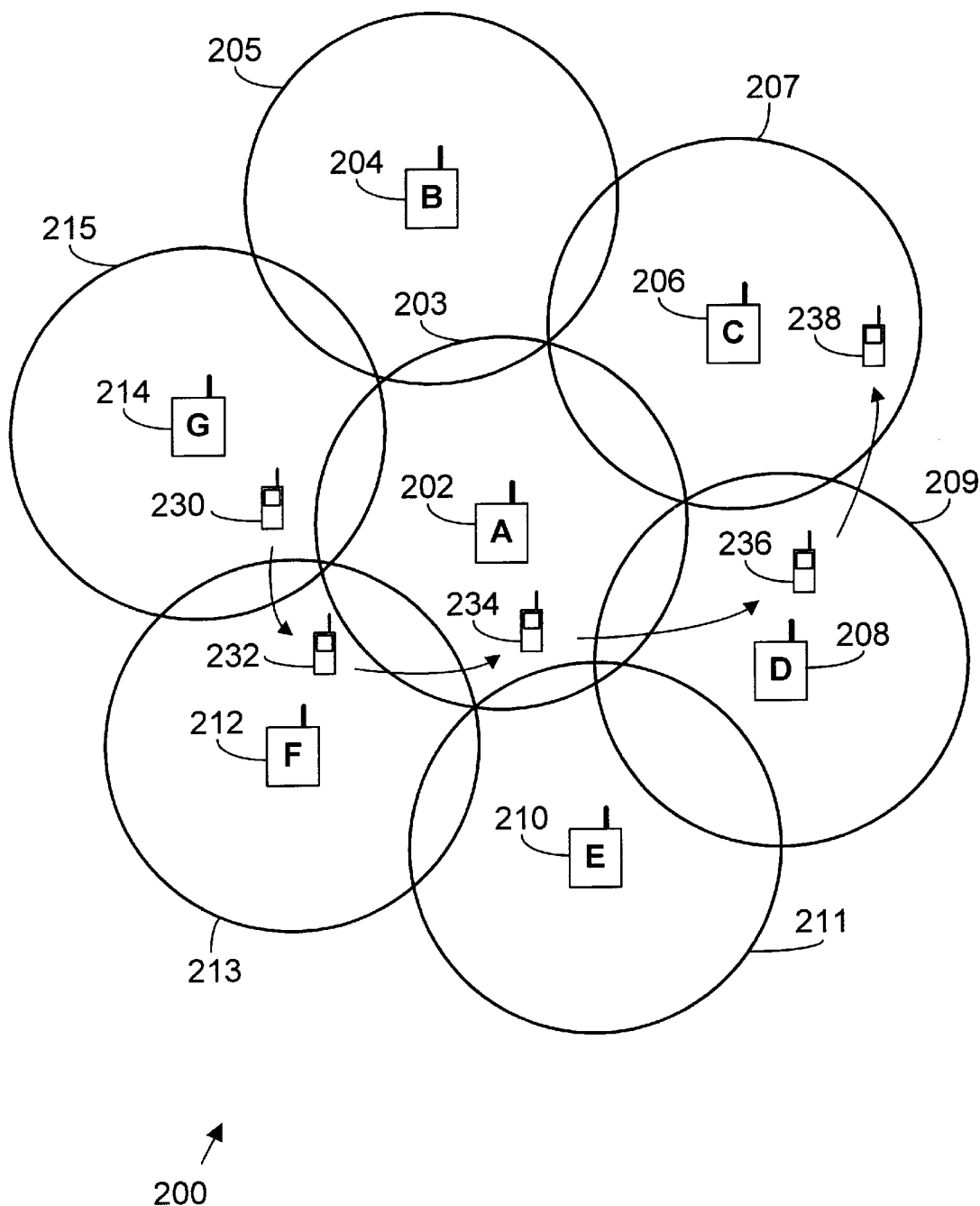
FIGS. 2A, 2B and 2C are diagrams illustrating schematically operation of a wireless communication system constructed according to the present invention.

FIG. 2A illustrates operation of a wireless communication system 200 constructed according to the present invention during movement of a mobile unit within a respective service area. The wireless communication system 200 includes base station A 202, base station B 204, base station C 206, base station D 208, base station E 210, base station F 212 and base station G 214. Each of these base stations provides wireless coverage within a respective cell. For example, base station A 202 provides wireless coverage within cell 203, base station B 204 provides wireless coverage within cell 205, base station C 206 provides wireless coverage within cell 207, and base station D 208 provides wireless coverage within cell 209. Moreover, base station E 210 provides wireless coverage within cell 211 while base stations F 212 and G 214 provide wireless coverage within cells 213 and 215, respectively. Each of the base stations 202, 204, 206, 208, 210 212 and 214 connects to an MSC (not shown) that provided further connectivity to the PSTN. It should be observed that the network cluster illustrated in FIG. 2A is an "omni-cell" network cluster.

As is shown, a mobile unit moves to various positions within the service area, each of which is identified by a numeral. At a first position 230, the mobile unit resides within cell 215 provided by base station G 214. Based upon standard operation according to the Code Division Multiple Access (CDMA) standard, the mobile unit has established a link with base station G 214 while at position 230. If the mobile call originated in base station G's 214 service area, call origination protocols (under IS-95, for example) are used. The call always originates with the base station whose pilot strength is the maximum of the received pilot strengths by the mobile unit.

Further at position 230, while the mobile unit communicates with base station G 214, it continuously measures/scans for other usable base stations by measuring their pilot signal strengths. Based upon receipt of a pilot signal, and its exceedance of respective threshold, for example, from base station F 212, the mobile unit sends a PSMM to the MSC via base station G 214. The MSC 214 responds with a handoff direction message (HDM) via base station G 214, directing the mobile unit to add base station F 212 to its active set, and thus establishing a link between the mobile unit and base station F 212. However, according to the present invention, when the link is established with base station F 212, base station F 212 does not transmit on the forward link established or transmits at a reduced power level. Alternatively, base station F 212 may immediately commence transmitting on a respective forward link and, once determined that its contribution is not needed, the base station F 212 ceases transmitting on the respective forward link As the mobile unit moves from position 230 to position 232, it moves away from base station G 214. Thus, base station G 214 must increase its forward link transmit power as directed by the power control to maintain the grade of service. As base station G's forward link transmit power increases above a threshold, the FLMU 104 located in the MSC 102 coordinating operation of the base stations directs base station F 212 to commence transmitting on its forward link to the mobile unit. The FLMU 104 may also direct the base station F 212 to transmit on the forward link, at a particular power level. In one embodiment, this power level could be at the same forward link transmit power level currently sent by base station G214 or otherwise as directed by the forward link power control of the present invention.

At position 232, the power control may require less power transmission on the forward link between base stations G 214 and F 212 and the mobile unit. At this point, as controlled by appropriate thresholds and control, base station G's 214 forward link transmissions may be reduced or stopped while maintaining the link. The link between the mobile unit and base station G 214 will be maintained until such time as the link is severed via standard operations such as when a respective pilot signal strength falls below a threshold level, the mobile unit sends an appropriate PSMM and the network severs the link. Thus, the link between base station G 214 (of F 212) and the mobile unit may be maintained longer in time than the time of actual signal transmission from base station G 214 (or F 212).

At position 232, the mobile unit is receiving forward link transmissions from base station F 212. Further, at such location 232, the mobile unit is receiving pilot signals from base station A 202 and base station E 210 at such levels as to trigger the transmission of a PSMM. Upon transmission of the PSMM to the MSC, the network responds with a HDM to establish a link between the mobile unit and base stations A 202 and E 210. However, at such time, the FLMU 104 directs base station A 202 and base station E 210 to transmit on respective forward links to the mobile unit either at a reduced power level or not to transmit on respective forward links to the mobile unit.

As the mobile unit moves from position 232 to position 234, the forward link transmit power from base station F 212 increases. When the forward link transmission power exceeds a threshold, transmissions from base station A 202 and base station E 210 will commence or will increase in their power, depending upon the embodiment. Thus, as such forward link transmissions commence or their power levels increase, the grade of service between the network and the mobile unit is maintained or improved. Further, by not transmitting on one or more forward links until such data is required by the mobile unit, system capacity is increased. In other words, transmissions on certain forward links are delayed until such time that, by not transmitting on the forward links, system capacity would be adversely impacted. At that point, transmissions are commenced.

At position 234, the mobile unit drops its link with base station F 212 or at least stops transmitting from base station F 212 or transmits at a low level. However, also at position 234, the mobile unit establishes a link with base station D 208. Based upon the forward link transmit power requirements, base station D 208 does not transmit on its respective forward link to the mobile unit. But, as the mobile unit moves from position 234 to position 236, base station D 208 commences transmitting on its forward link to the mobile unit or transmits on its forward link at a higher power level (anywhere up to the power control setting). Similarly, at position 236, the mobile unit establishes a link with base station C 206. Likewise, at position 236, base station C 206 does not transmit on its forward link to the mobile unit or, alternatively, the base station C 206 transmits on its forward link at a reduced power level. Then, when the mobile unit moves to position 238, based upon the forward link transmit power requirements as required by power control, base station C 206 will commence transmitting on its forward link at a higher power setting or at a power controlled setting. Consequently, base stations D 208, A 202, E 210 and C 206 may all be transmitting at the same power.

Figure 2B:
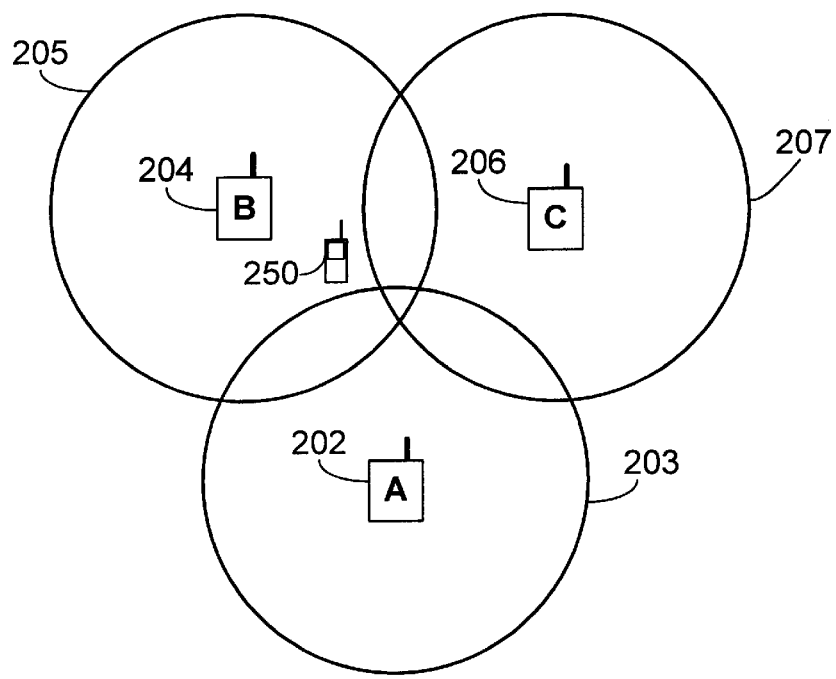
Figure 2C:
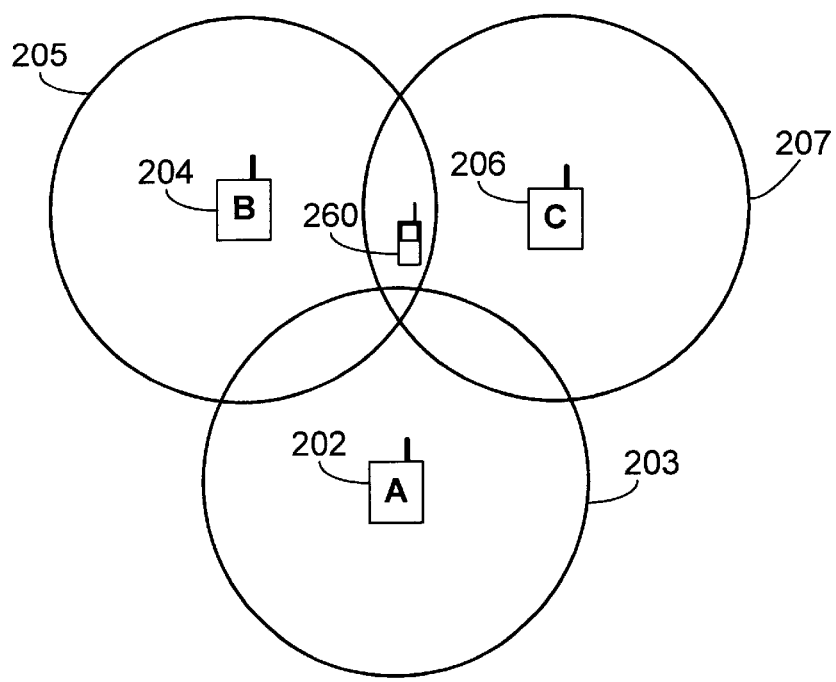

FIGS. 2B and 2C illustrate with more particularity, operation during handoff. FIG. 2B shows a mobile unit at position 250 in handoff between base stations A 202, B 204 and C 206. At position 250, a PSMM transmitted from the mobile includes power measures (Pc/i) for base station A 202 of −14 dB, base station B 204 of −9 dB and base station C 206 of −11 dB. In an operation according to prior techniques base stations A 202, B 204 and C 206 each would transmit at a level of $P_{PA1}$ to maintain the grade of service. However, according to the present invention, base stations B 204 and C 206 transmit at a level $P_{NEW1}$ that is approximately equal to $P_{PA1}$ to maintain an equivalent grade of service. In this operation, transmissions from base station A 202 are not needed, thus freeing power transmission resources for other mobile units.

FIG. 2C illustrates a wireless unit at position 260 still during handoff between base stations A 202, B 204 and C 206 at a later time. At position 260, a PSMM transmitted from the mobile includes power measures (Pc/i) for base station A 202 of −13 dB, base station B 204 of −11 dB and base station C 206 of −12 dB. In operation according to prior techniques, base stations A 202, B 204 and C 206 each would transmit at a level of $P_{PA2}$ to maintain the grade of service. According to the present invention, base stations A 202, B 204 and C 206 have also increased their transmission levels to maintain a grade of service, such transmission level at $P_{NEW2}$. Thresholds of operation according to the present invention are chosen so that the transmission level $P_{NEW2}$ is substantially equal to $P_{PA2}$. Thus, grade of service at position 260 is maintained without increasing total transmission power as compared to prior techniques while grade of service is maintained at position 250 while decreasing transmit power as compared to prior techniques.

Figure 3:
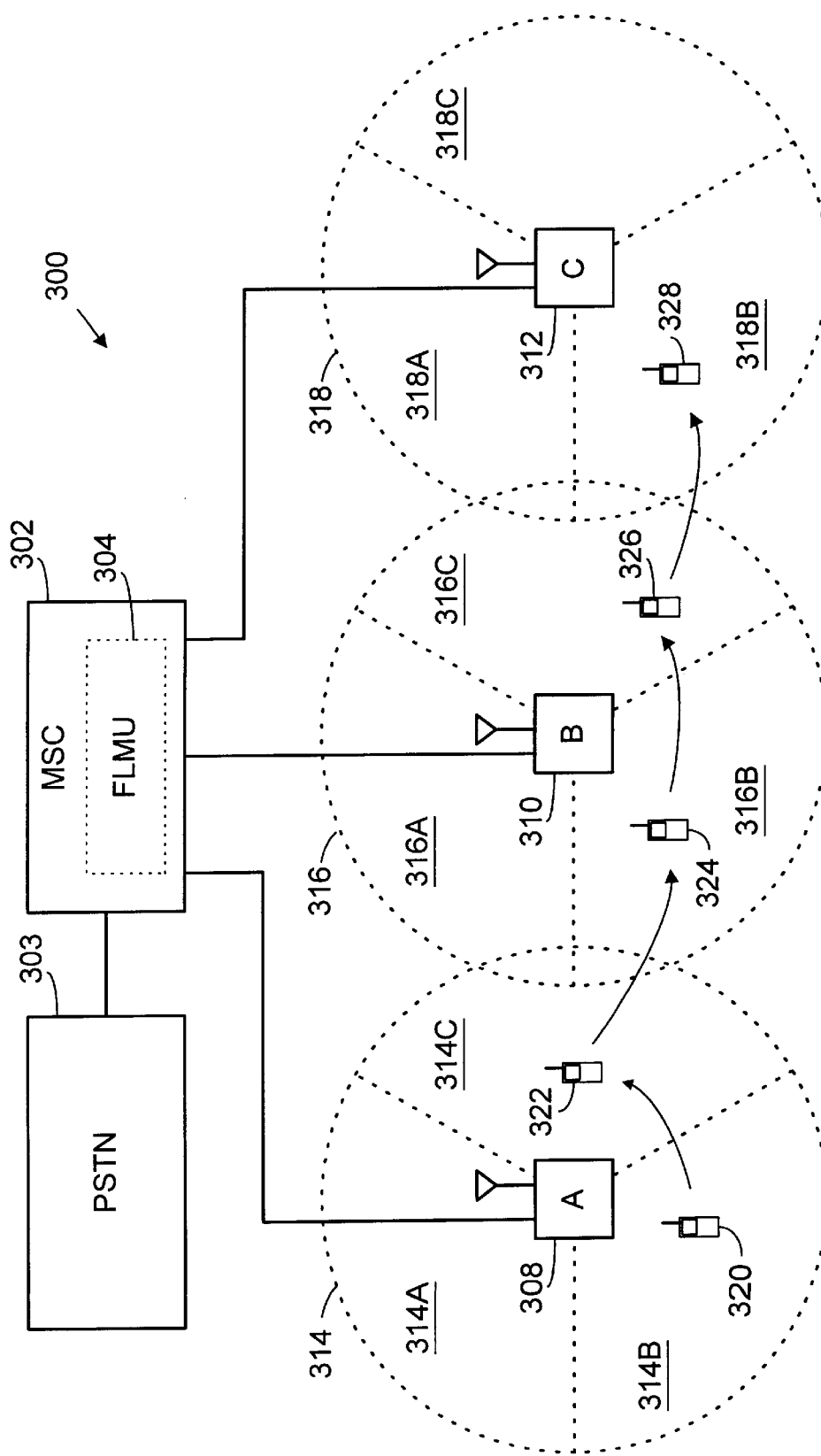
FIG. 3 is a block diagram illustrating a wireless communication system constructed according to the present invention in which a plurality of base stations each provide wireless coverage within multiple sectors.

FIG. 3 illustrates a wireless communication system 300 constructed according to the present invention in which the principles of the present invention are applied to soft handoff between sectors of different cells as well as to soft handoff between sectors of the same cell. The wireless communication system 300 includes an MSC 302 connected to a PSTN 303 and base station A 308, base station B 310, and base station C 312. Base station A 308 provides wireless coverage within cell 314. However, within cell 314, communications are divided into sectors 314A, 314B, and 314C. As is known, sectors typically are divided into angular degrees via use of directional antennas about the base station to increase the communication capacity served by the base station 308. Likewise, base station B 310 provides wireless coverage within cell 316. Cell 316 is divided into sectors 316A, 316B, and 316C. Likewise, base station C 312 provides wireless coverage within cell 318. Cell 318 is also divided into sectors 318A, 318B, and 318C.

A mobile unit operating in the service area of wireless communication system 300 moves from position 320 to position 322 to position 324 to position 326 and finally to position 328. At position 320, the mobile unit has established a link with sectors 314B and 314C of base station A308. Thus, the mobile unit receives forward link transmissions from the base station 308 and both sectors 314B and 314C. When the mobile unit moves to position 322 the mobile unit continues to receive forward link transmissions in sectors 314B and 314C. However, at such positions, the mobile unit receives strong pilot signals corresponding to sectors 316A and 316B. Based upon receipt of these pilot signals the mobile unit sends a PSMM via base station A 308. The network responds by establishing links between the mobile unit and sectors 316A and 316B via base station B 310. However, the FLMU 304 of the MSC 302 causes these sectors to provide forward link transmissions either at a reduced level to the mobile unit or to not provide such forward link transmissions at all. Further, as the mobile unit moves within the service area, it severs links as those links meet disconnecting criteria. The severing of links may be accomplished according to IS-95 standards, for example.

As the mobile unit moves from position 322 toward position 324 in order to maintain the grade of service, sectors 314B and 314C increase their forward link transmit powers. As their forward link transmit power is increased and exceeds a threshold, the FLMU 304 initiates forward link transmissions in sector 316B because it determined that sector 316B was the better link than sector 316A, perhaps from information received in a last PSMM. Alternately, transmissions from both base stations B 310 and A 308 are made, a PSMM request order is sent to the mobile unit and, upon receipt of a corresponding PSMM, it is determined that transmissions will continue from base station B 310 while transmissions from base station A 308 will cease. Based upon the forward link transmission power requirements the FLMU 304 may also increase forward link transmissions in sector 316A. At position 324, the mobile unit receives a pilot signal corresponding to sector 316C. Based upon this pilot signal, the mobile unit and network together establish a link between the mobile unit and sector 316C. Thus, as the mobile unit moves from position 324 to position 326 during a handoff, sector 316C may commence transmitting to the mobile unit.

Likewise, at position 326, the mobile unit receives pilot signals for sectors 318A and 318B and may request establishing links with such sectors. Then, after the links are established, the base station C may make forward link transmissions in sectors 318A and 318B at reduced levels or not transmit on its forward link at all. Thus, in accordance with those operations previously described, as the mobile unit moves to position 328, the FLMU 304 will direct forward link transmissions in sector 318B.

Thus, with the embodiment of the wireless communication system 300 of FIG. 3, forward link transmissions are managed so as to improve/maintain grade of service while increasing system capacity. As was shown, such principles may be readily applied between cells surrounding base stations as well as to sectors surrounding the base stations. In this fashion, soft handoffs between base stations as well as soft handoffs between sectors of the same base station may be made.

Figure 4:
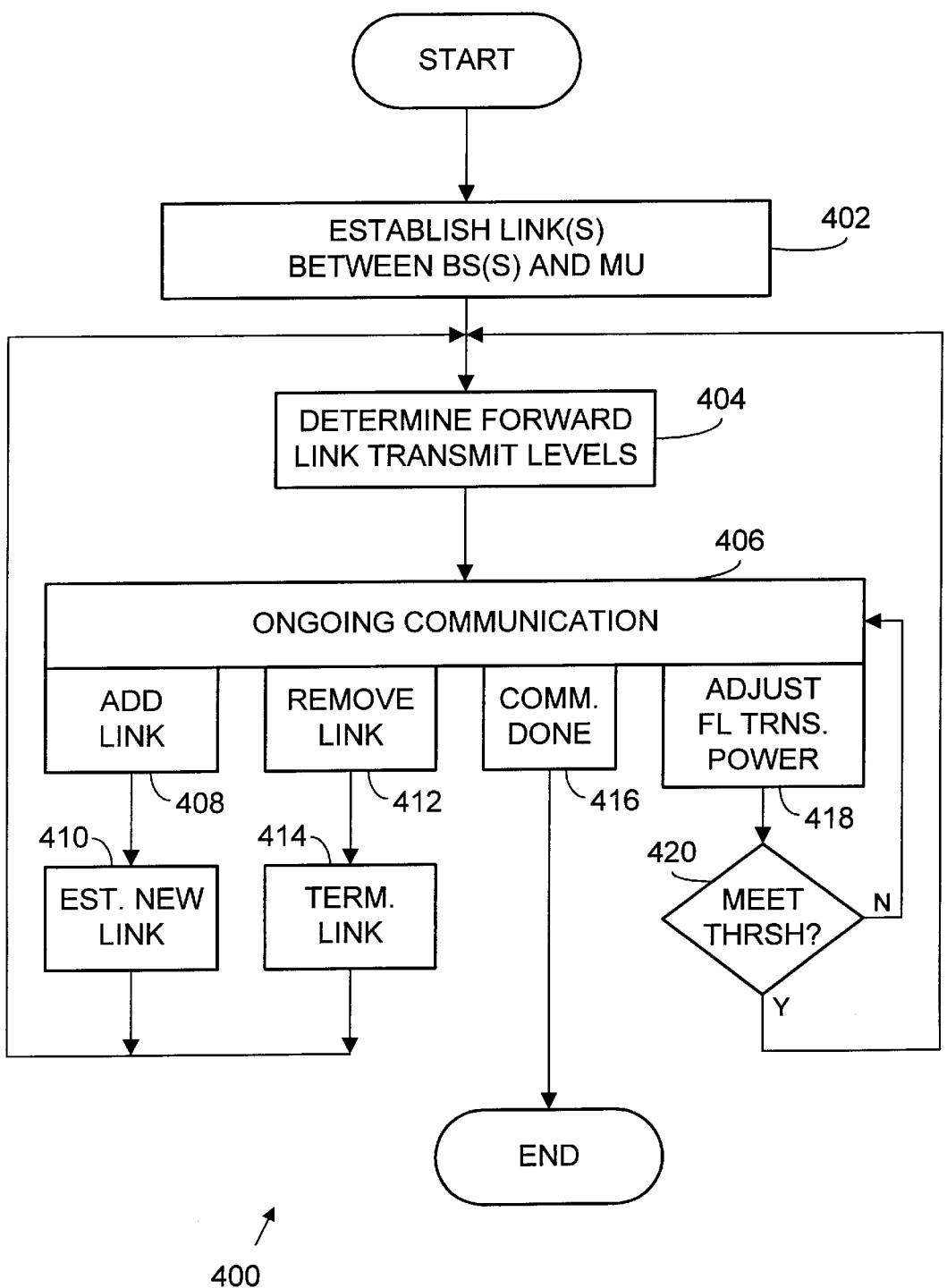
FIG. 4 is a flow diagram illustrating operation of a wireless communication system constructed according to the present.

FIG. 4 is a flow diagram illustrating operation of a wireless communication system constructed according to the present invention. The operation 400 includes steps employed in establishing communication between a mobile unit and the network. When the mobile unit does not require communication with the network, the steps may not be taken. Operation commences at step 402 wherein the network and the mobile unit jointly establish communication links between one or more sectors and a mobile unit. Such steps may be accomplished using techniques that are known in the art. Such techniques were previously described and may include receiving pilot signals from the sectors and, based upon the strength of the pilot signals, requesting links and establishing the links.

From step 402, operation proceeds to step 404 wherein the network determines forward link transmit levels. In determining forward link transmit levels, known forward link power control techniques are used as well as the teachings of the present invention. Determinations of forward link transmit power at step 404 are accomplished by a forward link management unit and are based upon information received from the mobile unit and the sectors. For example, as will be more fully described herein, the FLMU may determine that forward link transmissions are to a mobile unit be made from the two best sectors having links with the mobile unit.

The best sectors may be determined based upon the relative quality of reverse link transmissions received by the various sectors communicating with the mobile unit. In such case, the network would measure the strength of the reverse link at each sector having a link with the mobile unit. Based upon the measurements, the network would then assume that the forward link quality corresponded to that of the reverse link. In this embodiment, the sectors are sectors of different base stations.

In another embodiment, the best sectors would be determined based upon the strength of pilot signals received by the mobile unit. In PSMMs, the mobile unit would indicate to the network the strength of pilot signals received by the mobile unit. The network would then assume that the quality of forward link transmissions corresponded to the pilot signal transmissions. In still another embodiment, the mobile unit would measure the strength of forward link transmissions received and relay the strength information to the network on one or more reverse links. In receiving information related to the quality of the forward links, the network could receive information periodically from the mobile unit that indicated the quality of the forward links. Alternatively, the network could query the mobile unit to submit forward link quality information, e.g. in the form of a PSMM request order.

If the mobile unit is connected to four different sectors, at step 404, a determination may be made to transmit only on forward links corresponding to the two best sectors as determined by reverse link transmissions and not transmit on other forward links. Alternatively, the network could determine to transmit at full power (at the level determined by the power control algorithm) from the two most favorable sectors, at a reduced power from the third most favorable sector and to make no transmissions from the fourth most favorable sector. Of course, in differing operations, various other decisions may be made at step 404. Thus, according to the present invention, the power level to be transmitted on each forward link are determined at step 404, the power levels ranging from zero power to full power, wherein full power equals the level determined by the power control algorithm. As compared to prior systems in which typically all forward link transmissions were made at the same power level, the teachings of the present invention are applied to a system in which forward link power level is controlled upon each forward link and tailored to system conditions.

Next, at step 406, ongoing communications between the network and the mobile unit are performed. During such ongoing communications, forward transmissions are made via one or more of the sectors to the mobile unit according to the decisions made at step 404. The mobile unit uses maximal ratio combining or related combining techniques to combine the forward link transmissions and associated multi-path to improve decoding performance. Maximal ration combining is known and is not further described herein except as to expand upon the principles of the present invention.

From step 406, various operations may be taken. For example, at step 408, an event may occur that indicates an additional link should be made. For example, in monitoring pilot signals in a CDMA system, the mobile unit may measure a pilot signal whose strength exceeds a threshold level. Based upon the exceedance of the threshold level, the mobile unit then determines an additional link may be required. The mobile unit contacts the sector via a PSMM. The network responds either with a handoff direction message wherein operation proceeds to step 410 and the new link is established or responds with a base station acknowledgment order causing operation to continue at step 406. If the new link is established at step 410, operation proceeds again to step 404 wherein the forward link transmit levels are determined.

During the ongoing communication at step 406 the mobile unit may also determine that a link should be removed at step 410. When the mobile unit determines that the link should be removed at step 412, operation proceeds to step 414 wherein the link is terminated. From step 414 operation proceeds again to step 404.

When the communication is complete at step 416 the process ends. The completion of a communication may be done intentionally or may occur when ongoing links have been lost or inadvertently disconnected.

Finally, during the ongoing communication at step 406 the forward link transmit power may be adjusted. In a typical operation, the network will reduce the forward link transmit power on a stepwise basis until the mobile unit indicates that the forward link transmit power should be increased via a reverse link bit that indicates to the network of forward link frame "erasures." Thus, the forward link transmit power is typically continually adjusted to reduce the transmission power provided by the network to meet a required grade of service. During the adjustment of the forward link transmit power a threshold may be met. Thus, each time the forward link transmission power is adjusted, the network determines whether or not a threshold is met at step 420. If a threshold is not met, operation proceeds again to step 406. However, if a threshold is met at step 420, operation proceeds to step 404 wherein the new forward link transmit levels are determined or the choice is made on the sectors in the active set as to which sector(s) transmit on respective forward links to the mobile unit.

Step 420 may be accomplished in different fashions as well. For example, in another embodiment, the threshold may be determined as a rate of increase in forward link transmission power. During operation, when three successive forward link frames are erroneous, the forward link transmission power will be successively increased at a particular rate of increase. The rate of increase may meet a threshold which causes operation to move to block 404 wherein forward link transmission levels are re-determined. Upon such re-determination at step 404, the method may require that one or more additional sectors having links previously established with the mobile unit begin transmitting on their forward links. In still other embodiments, thresholds may be determined and varied over time according to system factors such as loading, network configuration, mobility and other factors. By varying the thresholds and operating with the varied thresholds further efficiencies and benefits may be achieved.

Figure 5:
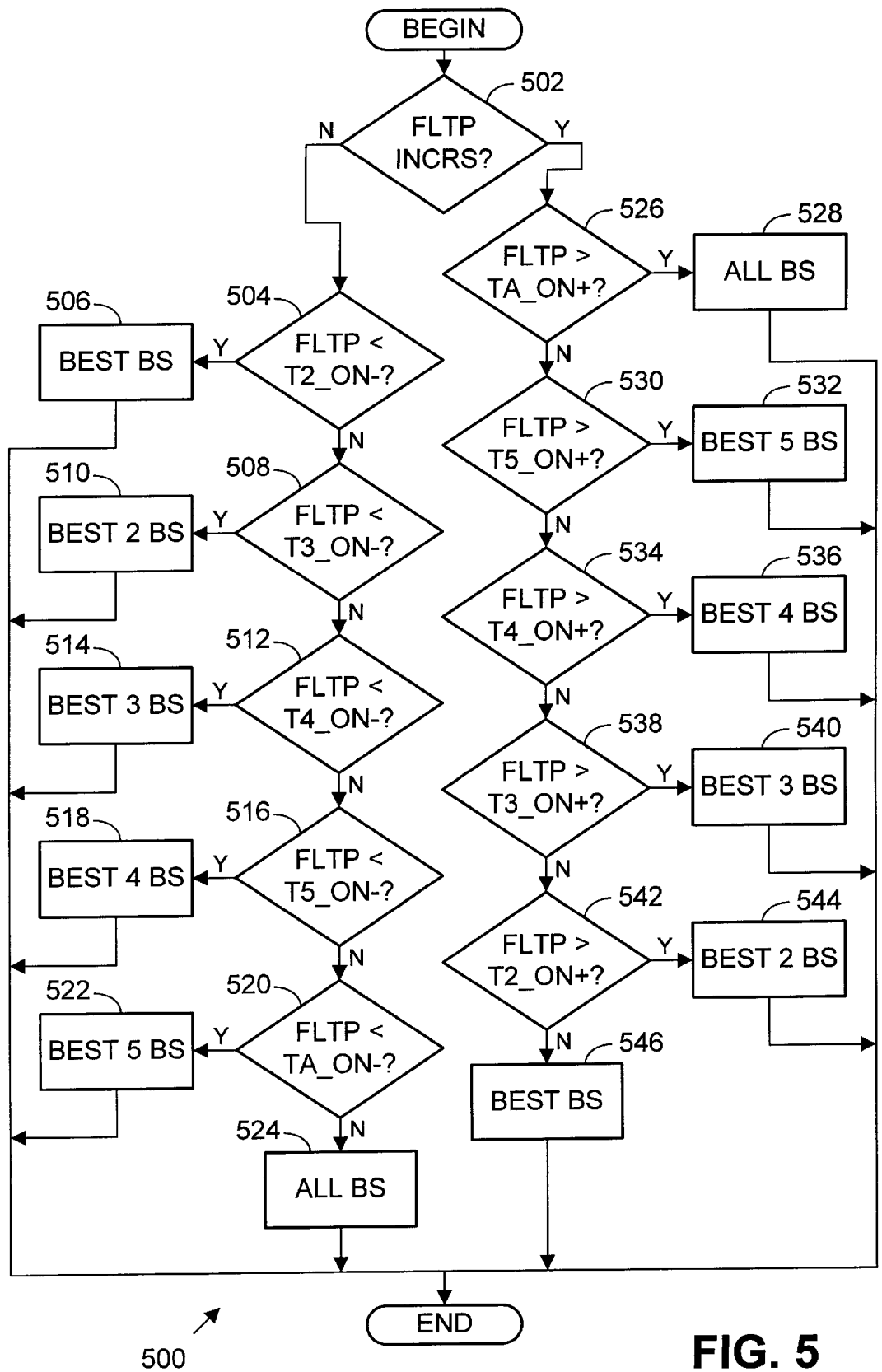
FIG. 5 is a flow diagram illustrating operation of the wireless communication system constructed according to the present invention in managing forward link transmissions.

FIG. 5 illustrates operation 500 of a wireless communication system constructed according to the present invention. The particular steps illustrated are those accomplished at step 404 illustrated in FIG. 4 after the threshold has been met. Operation commences at step 502 where it is determined whether or not the forward link transmit power adjustment (from the power control algorithm) was an increase. If the adjustment was not an increase (and thus a decrease), operation proceeds to step 504 where it is determined whether the forward link transmit power (FLTP) requirement, as requested from the power control algorithm, is less than the T2_ON− threshold. If so, operation proceeds to step 506 wherein the FLMU directs the network to transmit forward link communications from the best base station/sector.

If at step 504 it is determined that the FLTP requirement is not less than the T2_ON− threshold, operation proceeds to step 508 where it is determined whether the FLTP requirement is less than the T3_ON− threshold. If it is, operation proceeds to step 510 wherein forward link transmissions are made only from the two best base stations/sectors. Of course, if less than two sectors/base stations are involved in the handoff, only the strongest sector/base station is transmitted from.

If the FLTP requirement is not less than the T3_ON− threshold, operation proceeds to step 512 wherein it is determined whether the FLTP requirement is less than the T4_ON− threshold. If it is, operation proceeds to step 514 wherein forward link transmissions are made on the best three base stations/sectors. However, if at step 512, the FLTP requirement is not less than the T4_ON− threshold, operation proceeds to step 516. At step 516, it is determined whether the FLTP requirement is less than the T5_ON− threshold. If it is, operation proceeds to step 518 wherein forward link transmissions are made on the best four base stations/sectors. If at step 516 it is determined that the FLTP requirement is not less than the T5_ON− threshold, operation proceeds to step 520. At step 520 it is determined whether the FLTP requirement is less than the TA_ON− threshold. If it is, operation proceeds to step 522 wherein forward link transmissions are made from the best five base stations/sectors. However, if at step 520 it is determined that the FLTP requirement is not less than the TA_ON− threshold, forward link transmissions are made from all connected base stations/sectors at step 524. From steps 506, 510, 514, 518, 522 and 524 operation proceeds again to step 406 of FIG. 4.

If at step 502 it is determined that the FLTP requirement has increased, operation proceeds to step 526. At step 526, it is determined whether the FLTP requirement is greater than the TA_ON+ threshold. If so, the FLMU directs all connected base stations/sectors to transmit. However, if not, operation proceeds to step 530 where it is determined whether the FLTP requirement is greater than the T5_ON+ threshold. If it is, forward link transmissions are made from the five best base stations/sectors. However, it not, operation proceeds to step 534 where it is determined whether the FLTP requirement is greater than the T4_ON+ threshold. If so, operation proceeds to step 536 wherein the FLMU directs that forward link transmissions be made from the four best base stations/sectors. If not, operation proceeds to step 538.

At step 538, it is determined whether the FLTP requirement is greater than the T3_ON− threshold. If so, operation proceeds to step 540 wherein the FLMU directs the three best base stations/sectors to transmit on their forward links to the mobile unit. If not, operation proceeds to step 542 wherein it is determined whether the FLTP requirement is greater than the T2_ON+ threshold. If so, operation proceeds to step 544 wherein the FLMU directs the two strongest base stations/sectors to transmit on their forward links to the mobile unit. If at step 542, the determination is no, operation proceeds to step 546 wherein the FLMU directs only the best base station to transmit on its forward link to the mobile unit. From steps 528, 532, 536, 540, 544 and 546, operation returns again to step 406.

The flow diagram of FIG. 5 is optimal for sectors of different base stations wherein new link information can immediately be used to determine the best sectors. However, for cases that involve sectorized networks as opposed to omni-networks, the illustrated operations would be modified slightly. Should the FLTP requirement 602 go above a threshold, transmission would immediately commence on all connected sectors. A PSMM Request Order would then be sent to the mobile unit. The mobile unit would then respond with a PSMM and, based upon the PSMM, the best sectors could be determined. The best sectors would then continue to transmit while the lesser sectors would be selectively switched off as would be possible according to the algorithm.

Figure 6:
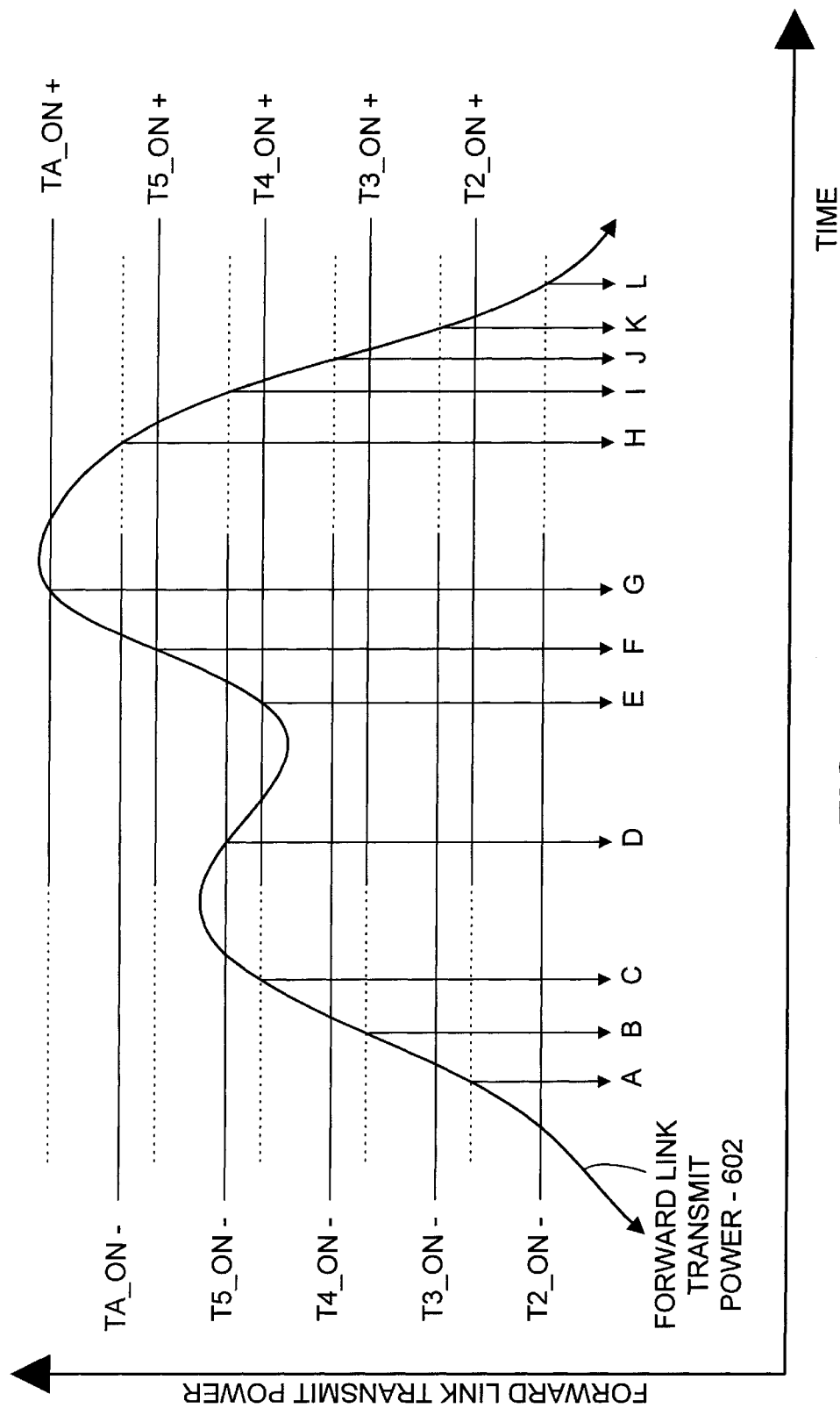
FIG. 6 is a diagram illustrating operation of a wireless communication system constructed according to the present invention in managing forward link transmissions.

FIG. 6 illustrates operation of multiple forward links within a wireless communication system constructed according to the present invention as a mobile unit roams throughout a respective service area and is in soft handoff with six sectors/base stations. FLTP requirement 602 is plotted against time, as time is increasing to the right. As illustrated, the thresholds on the left, TA_ON−, T5_ON−, T4_ON−, T3_ON− and T2_ON−, are used for decreasing levels of FLTP requirement 602 while the thresholds shown on the right, TA_ON+, T5_ON+, T4_ON+, T3_ON+ and T2_ON+, are used for increasing levels of the FLTP requirement 602. These thresholds are the same as those that were previously described with respect to FIG. 5. As is shown, as time increases toward time A, the FLTP requirement 602 is increasing. At time A, the FLTP requirement 602 exceeds the threshold T2_ON+. Thus, prior to exceeding that threshold, only a single base station/sector was providing forward link transmissions, even though the mobile unit was connected to at least six cells/sectors of the network.

As the FLTP requirement 602 exceeds the T2_ON+ threshold at time A, according to operation of the present invention, the second best performing base station/sector begins providing forward link transmissions. However, the FLTP requirement 602 continues to increase until it reaches the T3_ON+ threshold at time B. At such time, an additional base station/sector is instructed to provide forward link transmissions. However, the FLTP requirement 602 continues to increase after time B until it reaches the T4_ON+ threshold at time C. Thus, at time C, the FLMU directs an additional base station/sector to begin providing forward link transmissions so that four separate base stations/sectors are providing forward link transmissions.

After time C, the forward link transmit power peaks and begins to decrease. As it moves below the T5_ON− threshold at time D, the weakest base station/sector is directed not to transmit on its forward link. After time D, the FLTP requirement 602 continues to decrease until it again increases and crosses the T4_ON+ threshold as time E. When the T4_ON+ threshold is crossed at time E, the FLMU makes a determination as to which of the connected base stations is the best and directs the four best base stations/sectors to provide forward link transmissions.

After time E, the FLTP requirement 602 continues to increase until it crosses the T5_ON+ threshold at time F. When the T5_ON+ threshold is crosses at time F the FLMU determines the best five base stations/sectors and directs the best five base stations/sectors to provide forward link transmissions. However, the FLTP requirement 602 continues to increase until it exceeds the TA_ON+ threshold at time G. At such time, the FLMU directs all connected base stations/sectors to make forward link transmissions to the mobile unit. As shown, after time G, the FLTP requirement 602 decreases until it goes below the TA_ON− threshold at time H. As it crosses the TA_ON− threshold at time H, the FLMU evaluates the forward link power levels and directs the five best base stations/sectors to transmit on their forward links to the mobile unit.

As the FLTP requirement continues to decrease it moves past the T5_ON− threshold at time I. When it crosses the threshold, the FLMU directs only the four best base stations/sectors to produce forward link transmissions. Next, as the FLTP requirement decreases to go below the T4_ON− threshold at time J the FLMU directs only the three best base stations/sectors to provide forward link transmissions. Likewise, as the FLTP requirement 602 decreases below the T3_ON− threshold at time K, the FLMU directs the two best base stations/sectors to provide forward link transmissions. Finally, as the FLTP requirement 602 decreases below the T2_ON− threshold at time L, the FLMU directs only the strongest base station/sector to provide forward link transmissions.

Of course, all of these operations are occurring while the mobile unit is scanning for pilot signals, measuring their strengths and transmitting PSMMs as appropriate. These operations may add new sectors/base stations to the active set or remove sectors/base stations from the active set. When these sectors/base stations are added or removed, operation according to the present invention may be affected in determining which forward links, corresponding to the sectors/base stations, are to be adjusted.

Thus, operation of the wireless communication system according to the present invention causes only the most favorable base stations/sectors to provide forward link transmissions to the mobile unit. Further, such most favorable base stations/sectors provide forward link transmissions only when failure to do so would impact grade of service and would actually minimize system capacity. Thus, system capacity is increased while the grade of service is maintained/increased. As compared to the prior art, a system incorporating the teachings of the present invention would have greater system capacity because the hrf is reduced as sector transmissions are controlled. At the same, $(g^2*f)$ is not impacted adversely because the diversity is not affected by the optimized choice of thresholds used in adjusting the forward link transmit power levels. Of course, to achieve such benefits, threshold levels should be selected based upon expected system loading levels.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A wireless communication system that facilitates wireless communication with a mobile unit operating within a respective service area, the wireless communication system comprising:

a mobile switching center;

a plurality of base stations, each base station coupled to the mobile switching center, each base station providing wireless coverage within a respective portion of the service area;

the wireless communication system interacting with the mobile unit to place an active set of base stations of the plurality of base stations into the active set of the mobile unit;

when the mobile unit requires forward link transmissions from all of the active set of base stations, forward link transmissions are provided by each of the base stations in the active set of the mobile unit; and when the mobile unit does not require forward link transmissions from all of the active set of base stations, forward link transmissions from a base station of the active set of base stations to the mobile unit are discontinued without removing the base station from the active set of the mobile unit.

2. The wireless communication system of claim 1, wherein:

a determination to discontinue transmissions from the base station of the active set of base stations is based upon the quality of transmissions received by the active set of base stations by the mobile unit on corresponding reverse links.

3. The wireless communication system of claim 1, wherein when the mobile unit requires transmissions from the base station of the active set of base stations transmissions from the base station of the active set of base stations are reinitiated.

4. The wireless communication system of claim 1, wherein:

a determination to discontinue transmissions from the base station of the active set of base stations is based upon information contained in a pilot strength measurement message transmitted from the mobile unit.

5. The wireless communication system of claim 1, wherein:

a determination to discontinue transmissions from the base station of the active set of base stations is based upon information contained in a signal strength message transmitted from the mobile unit in response to a request.

6. The wireless communication system of claim 1, wherein during operation:

transmissions are made on some of the forward links at respective power levels; and transmissions are not made on other of the forward links.

7. The wireless communication system of claim 1, wherein:

transmissions are made on the most favorable forward links at respective power levels; and transmissions are not made on the least favorable forward links.

8. The wireless communication system of claim 7, wherein the most favorable forward links are determined based upon information provided to the at least two base stations by the mobile unit.

9. The wireless communication system of claim 1, wherein forward link transmissions are initiated and discontinued based upon the forward link transmission power requirements of the mobile unit.

10. The wireless communication system of claim 9, wherein in determining whether forward link transmissions are initiated or discontinued, the forward link transmission power requirements of the mobile unit are compared to a plurality of thresholds.

11. The wireless communication system of claim 10, wherein the plurality of thresholds comprise forward link power levels.

12. The wireless communication system of claim 10, wherein the plurality of thresholds comprise at least one rate of change in the forward link power level.

13. The wireless communication system of claim 1, further comprising a forward link management unit that manages forward link transmissions on the forward links.

14. The wireless communication system of claim 1, the wireless communication system operating according to a code division multiple access protocol.

15. The wireless communication system of claim 1, wherein:

each base station provides wireless coverage within a plurality of sectors;

the wireless communication system interacting with the mobile unit to place an active set of sectors into the active set of the mobile unit;

when the mobile unit does not require forward link transmissions from all of the active set of sectors, forward link transmissions from a sector of the active set of sectors to the mobile unit are discontinued without removing the sector from the active set of the mobile unit.

16. A wireless communication system that facilitates wireless communication with a mobile unit operating within a respective service area, the wireless communication system comprising:

a mobile switching center;

a plurality of base stations that are coupled to the mobile switching center, each base station providing at least one sector within which wireless coverage is provided and forming a respective portion of the service area;

the wireless communication system interacting with the mobile unit to place an active set of sectors into the active set of the mobile unit;

when the mobile unit requires forward link transmissions from all of the active set of sectors, forward link transmissions are provided by each of the sectors in the active set of the mobile unit; and when the mobile unit does not require forward link transmissions from all of the active set of sectors, forward link transmissions from a sector of the active set of sectors to the mobile unit are discontinued without removing the sector from the active set of the mobile unit.

17. The wireless communication system of claim 16, wherein:

the mobile unit transmits to the active set of sectors via a respectively plurality of reverse links; and a determination to discontinue transmissions from the sector of the active set of sectors is based upon the quality of corresponding transmissions from the respective plurality of reverse links.

18. The wireless communication system of claim 16, wherein at least some of the respective transmit levels of the active set of sectors vary from other of the respective transmit levels of the active set of sectors.

19. The wireless communication system of claim 16, wherein:

a determination to discontinue transmissions from the sector of the active set of sectors is based upon information contained in a pilot strength measurement message transmitted from the mobile unit.

20. The wireless communication system of claim 16, wherein:

a determination to discontinue transmissions from the sector of the active set of sectors is based upon information contained in a signal strength message transmitted from the mobile unit in response to a request.

21. The wireless communication system of claim 16, wherein during operation:

transmissions are made on some of the forward links at respective power levels; and transmissions are not made on other of the forward links.

22. The wireless communication system of claim 16, wherein:

transmissions are made on the most favorable forward links at respective power levels; and transmissions are not made on the least favorable forward links.

23. The wireless communication system of claim 22, wherein the most favorable forward links are determined based upon information provided to the active set of sectors by the mobile unit.

24. The wireless communication system of claim 16, wherein forward link transmissions are initiated and discontinued based upon the forward link transmission power requirements of the mobile unit.

25. The wireless communication system of claim 24, wherein in determining whether forward link transmissions are initiated or discontinued, the forward link transmission power requirements of the mobile unit are compared to a plurality of thresholds.

26. The wireless communication system of claim 25, wherein the plurality of thresholds comprise forward link power levels.

27. The wireless communication system of claim 25, wherein the plurality of thresholds comprise at least one rate of change in the forward link power level.

28. The wireless communication system of claim 16, further comprising a forward link management unit that manages forward link transmissions on the forward links.

29. The wireless communication system of claim 16, the wireless communication system operating according to a code division multiple access protocol.

30. A method of operating a wireless communication system that facilitates wireless communication with a mobile unit operating within a respective service area, method comprising:

coupling a plurality of base stations to a mobile switching center;

providing, by the plurality of base stations, wireless coverage within a respective portion of the service area;

placing an active set of base stations of the plurality of base stations into the active set of the mobile unit;

when the mobile unit requires forward link transmissions from all of the active set of base stations, transmitting from each of the active set of base stations to the mobile unit on respective forward links; and when the mobile unit does not require forward link transmissions from all of the active set of base stations, discontinuing forward link transmissions from a base station of the active set of base stations to the mobile unit without removing the base station from the active set of the mobile unit.

31. The method of claim 30, further comprising the steps of:

the mobile unit transmitting to the active set of base stations via a respective plurality of reverse links; and determining to discontinue transmissions from the base station of the active set of base stations based upon the quality of corresponding reverse link transmissions.

32. The method of claim 30, further comprising managing the forward links so that at least some of the respective transmit levels vary from other of the respective transmit levels.

33. The method of claim 30, further comprising:

transmitting on some of the forward links; and not transmitting made on other of the forward links.

34. The method of claim 30, further comprising:

transmitting on the most favorable forward links; and not transmitting on the least favorable forward links.

35. The method of claim 34, wherein the most favorable forward links are determined based upon the quality of transmissions from the mobile unit to the active set of base stations.

36. The method of claim 34, wherein the most favorable forward links are determined based upon indications of forward link transmission quality received from the mobile unit.

37. The method of claim 30, wherein forward link transmissions are initiated and discontinued based upon the forward link transmission power requirements of the mobile unit.

38. The method of claim 37, wherein in determining whether forward link transmissions are initiated or discontinued, the forward link transmission power requirements of the mobile unit are compared to a plurality of thresholds.

39. The method of claim 38, wherein the plurality of thresholds comprise forward link power levels.

40. The method of claim 38, wherein the plurality of thresholds comprise at least one rate of change in the forward link power level.

41. The method of claim 30, further comprising managing the forward link transmissions at the mobile switching center.

42. The method of claim 30, further comprising operating the wireless communication system according to a code division multiple access protocol.

43. The method of claim 30, further comprising:

for each of the plurality of base stations, providing wireless coverage within a plurality of sectors, with each base station capable of establishing wireless communication with the mobile unit via any of the plurality of sectors;

placing an active set of sectors into the active set of the mobile unit; and when the mobile unit does not require forward link transmissions from all of the active set of sectors, discontinuing forward link transmissions from a sector of the active set of sectors to the mobile unit without removing the sector from the active set of the mobile unit.

* * * * *